United States Patent [19]

Ohsawa et al.

[11] Patent Number: 4,876,610
[45] Date of Patent: Oct. 24, 1989

[54] IMAGE PROCESSING APPARATUS WITH BINARIZATION-ERROR DISPERSAL

[75] Inventors: Hidefumi Ohsawa, Kawaguchi; Akihiro Katayama, Kawasaki; Hiroshi Hosokawa, Yokohama; Izuru Sunohara, Ichikawa; Masahiko Yoshimoto, Yokohama, all of Japan

[73] Assignee: Canon Kabushiki Kaisha, Tokyo, Japan

[21] Appl. No.: 137,439

[22] Filed: Dec. 23, 1987

[30] Foreign Application Priority Data

Dec. 25, 1986 [JP] Japan .................................. 61-313168
May 21, 1987 [JP] Japan .................................. 62-122611

[51] Int. Cl.$^4$ ............................................. H04N 1/40
[52] U.S. Cl. ..................................... 358/443; 382/54; 358/456
[58] Field of Search ............... 358/284, 283, 256, 280, 358/287; 382/54; 371/31

[56] References Cited

U.S. PATENT DOCUMENTS

| 4,547,811 | 10/1985 | Ochi ..................................... 358/280 |
| 4,549,212 | 10/1985 | Bayer .................................... 358/284 |
| 4,554,593 | 11/1985 | Fox et al. ............................. 382/50 |
| 4,692,811 | 9/1987 | Tsuchiya ............................. 358/284 |
| 4,703,363 | 10/1987 | Kitamura ............................ 358/284 |
| 4,742,400 | 5/1988 | Tsuji .................................... 358/283 |
| 4,747,156 | 5/1988 | Wahl .................................... 382/54 |
| 4,774,544 | 2/1988 | Matsumoto .......................... 382/54 |

OTHER PUBLICATIONS

"An Adaptive Algorithm for Spatial Grey Scale", Floyd and Steinberg, pp. 36-37, SID 75.

*Primary Examiner*—Edward L. Coles, Sr.
*Assistant Examiner*—Jerome Grant, II
*Attorney, Agent, or Firm*—Fitzpatrick, Cella, Harper & Scinto

[57] ABSTRACT

An image processing apparatus for digitizing an analog image by dispersing the digitizing error to the surrounding areas. The characteristics or edge of the analog image are identified, and the error dispersing area is varied according to the result of identification, thus enabling reproduction of the image with high quality regardless of the nature of the original image.

37 Claims, 15 Drawing Sheets

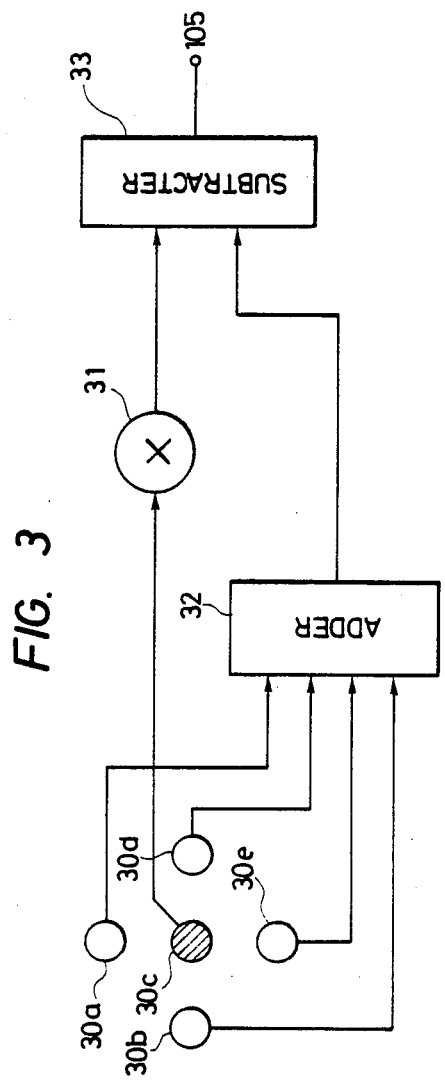

| 1 | 3 | 5 | 3 | 1 |
|---|---|---|---|---|
| 3 | 5 | 7 | 5 | 3 |
| 5 | 7 | * |   |   |

↖ 66

| 1 | 2 | 1 |
|---|---|---|
| 2 | * |   |

↙ 66

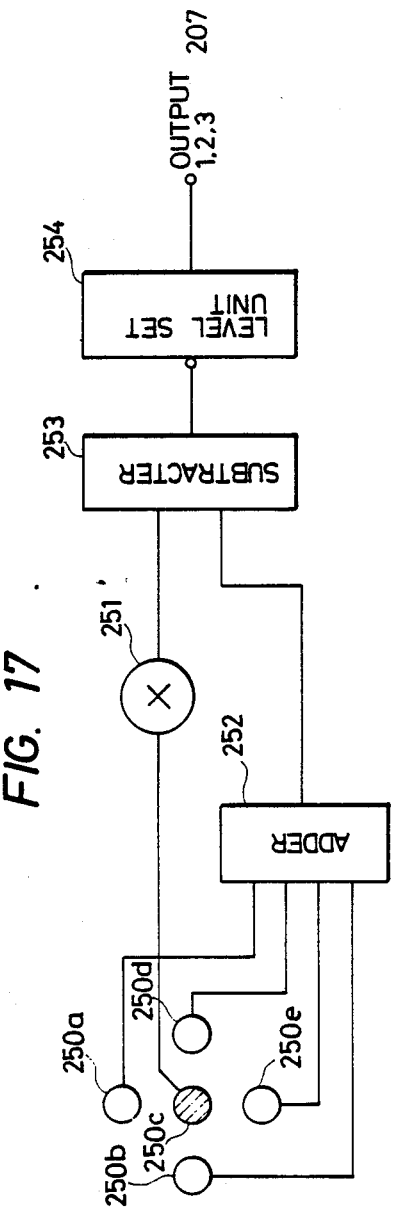

IMAGE PROCESSING APPARATUS WITH BINARIZATION-ERROR DISPERSAL

BACKGROUND OF THE INVENTION

1. Field of the Invention

The present invention relates to an image processing apparatus for processing an image in digital manner.

2. Related Background Art

Conventional analog copying machines are being replaced by so-called digital copying machines, in which an original image is sampled for example with a CCD sensor, and the image is reproduced from the digitized data through a digital printer such as a laser beam printer, owing to the progress in digital devices.

In such digital copying machines, a dither method or density pattern method is employed for reproducing intermediate tones. Such methods have however been associated with following drawbacks:

(1) If the original image has screen dots, as in a printed image, the copied image shows periodic stripe patterns not present in the original image; and (2) If the original image contains lines or characters, the edges of such lines or characters are broken by the dither process, and the image quality is deteriorated.

The phenomenon (1), called Moire patterns, arises from:

(A) beats between the screen dots of the original image and the sampling operation; or (B) beats between the screen dots of the original image and the dither threshold matrix.

The phenomenon (B) is particularly apparent when the dither threshold values are arranged in a dot concentrated pattern. In such case the output image has a pseudo-screen dot pattern, which generates beats with the screen dots of the original image, thus leading to a Moire phenomenon.

For digitization of an original image, there is also known an error dispersion method, in which the difference between the density of the original image and the density of the output image is calculated for each pixel, and the error obtained from said calculation is dispersed to the surrounding pixels with a certain weighting. This method was reported by R. W. Floyd and L. Steinberg in "An Adaptive Algorithm for Spatial Grey Scale", SID 17, pp. 75–77 (1976). This method does not generate Moire patterns in the reproduction from a screen dot image, as it lacks periodicity in the process, in comparison with the dither method. However, it is still associated with certain drawbacks such as stripe patterns in the output image specific to this method, and granular noise in the highlight areas or dark areas of the image.

SUMMARY OF THE INVENTION

An object of the present invention is to eliminate the drawbacks of the conventional technologies explained above.

Another object of the present invention is to provide an improvement on image processing apparatus.

Still another object of the present invention is to provide an image processing apparatus capable of precisely reproducing an image with high quality, regardless of the nature of the original image.

Still another object of the present invention is to provide an image processing apparatus capable of identifying the characteristics of the image and varying the area for dispersing the error generated in the digitization of the image, according to the result of said identification.

Still another object of the present invention is to provide an image processing apparatus capable of detecting the amount of edges in the image and varying the area for dispersing the error generated in the digitization of the image, according to the result of said detection.

Still another object of the present invention is to provide an image processing apparatus capable of identifying the nature of the image and varying the process of the error dispersing method, according to the result of said identification.

The foregoing and still other objects of the present invention, and the advantages thereof, will become fully apparent from the following description to be taken in conjunction with the attached drawings.

BRIEF DESCRIPTION OF THE DRAWINGS

FIG. 3 is a block diagram of a Laplacian processor;

FIGS. 4A to 4C are charts showing examples of Laplacian coefficients;

FIG. 17 is a block diagram of a Laplacian processor;

FIGS. 18A to 18C are charts showing examples of Laplacian coefficients;

DETAILED DESCRIPTION OF THE PREFERRED EMBODIMENTS

Now the present invention will be clarified in detail by embodiments thereof shown in the attached drawings.

Figure 1:
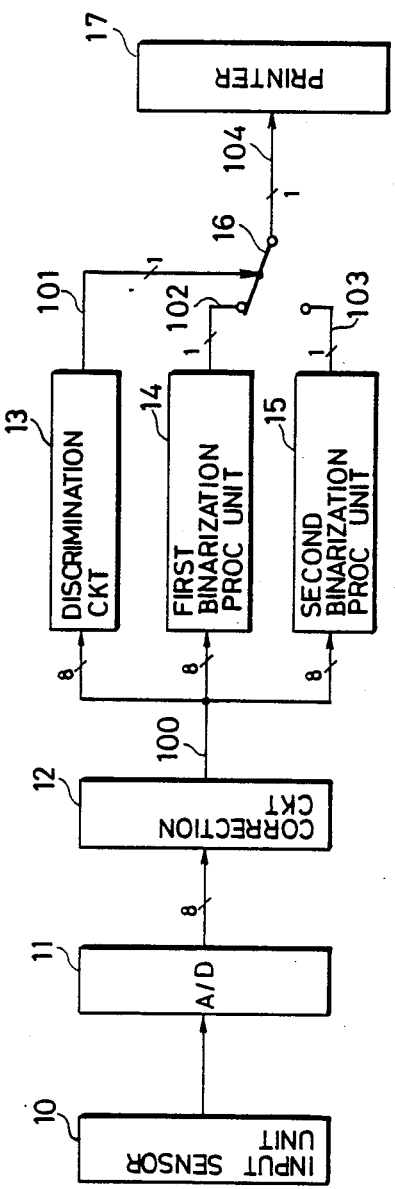
FIG. 1 is a block diagram of a first embodiment of the image processing apparatus of the present invention.

FIG. 1 is a block diagram of an image processing apparatus embodying the present invention, wherein image 5 data, read by an input sensor unit 10 provided with a photoelectric converting device such as a CCD and a driving system for said device, are supplied in succession to an A/D converter 11, for converting each pixel into digital data for example of 8 bits. In this manner the original image is digitized into data of 256 levels. Then a correction circuit 12 executes digital correction, processes, such as shading correction for compensating the unevenness in the sensitivity of sensor and the unevenness in the illumination by a light source. The corrected signal 100 is then supplied to a discrimination circuit 13 and two binary digitizing circuits 14, 15.

The discrimination circuit 13 generates a discrimination signal indicating the nature of the input image, based on the image signal, and shifts a switch 16 by said discrimination signal.

The first binary digitizing circuit 14 executes binary digitization by an error dispersion method in which the error is dispersed with a relatively large matrix. On the other hand, the second binary digitizing circuit 15 executes binary digitization by an error dispersion method in which the error is dispersed with a relatively small-size matrix.

Example of discrimination 1

The error dispersion method is characterized as follows according to the size of the error dispersing matrix:

Large matrix size: stripe patterns in the intermediate density area are relatively fine and not conspicuous, but white areas are often generated at right to and below the edges of characters;

Small matrix size: stripe patterns in the inter-mediate density area are relatively extensive and conspicuous, but no white areas are generated adjacent to the edges of the characters.

Thus, the switch 16 is shifted to select the first digitized output signal or the second digitized output signal, according to the output of the discrimination circuit 13.

The binary signal is then used for turning on and off the dots in a binary printer 17, thus forming an image.

Figure 2:
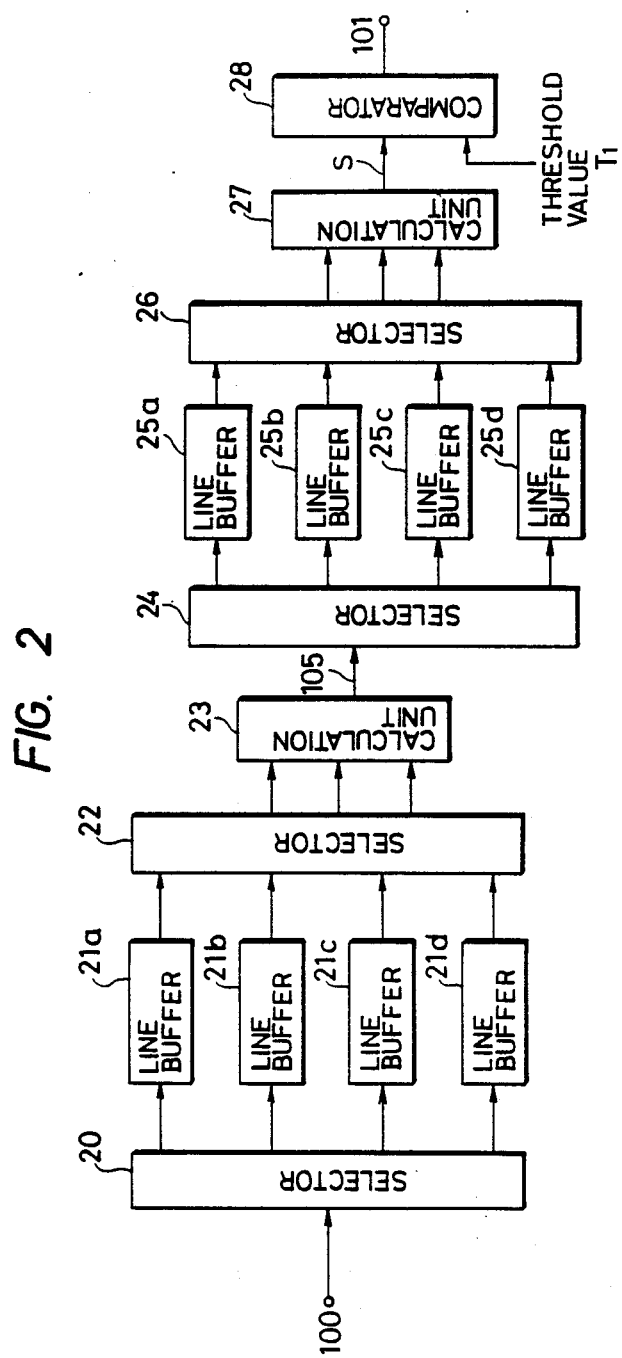
FIG. 2 is a block diagram of an example of a discrimination circuit.

FIG. 2 is a block diagram showing an example of the discrimination circuit 13 for discriminating characters and screen dots (edge portions) from photographs and background (non-edge portions).

The image signal 100 corrected by the correction circuit 12 is supplied to one of line buffers 21a–21d selected by a selector 20. While one of the line buffers 21a–21d is in writing operation, the other three are in reading operation. When the first line buffer 21a is filled with the image data 100, the succeeding data are stored in the second line buffer 21b, then third and fourth line buffers 21c, 21d, and, when said fourth line buffer is filled, the data writing returns to the first line buffer 21a.

Consequently, the data of three consecutive lines, preceding the line currently in writing operation, are stored in the line buffers. Said data are selected by a selector 22, and supplied to a calculation unit 23 for a Laplacian processing wi&h coefficients as shown in FIG. 4A. FIG. 3 is a block diagram of an example of said calculation unit 23. In FIG. 3, 30a–30e indicate the positions of the pixel data. The image signal of a central pixel 30c is multiplied by a constant in a multiplier 31, and is then supplied to a subtracter 33.

On the other hand, the signals of surrounding pixels 30a, 30b, 30d and 30e are added in an adder 32, of which output is supplied to the subtracter 33 for calculating the difference from the output of the multiplier 31. The resulting output 105 is stored in one of line buffers 25a–25d selected by a selector 24 shown in FIG. 2. The output signals 105 of consequtive three lines, stored in the line buffers 25a–25d, are supplied, by a selector 26, to a conseqvtive calculating unit 27.

Figure 5A:
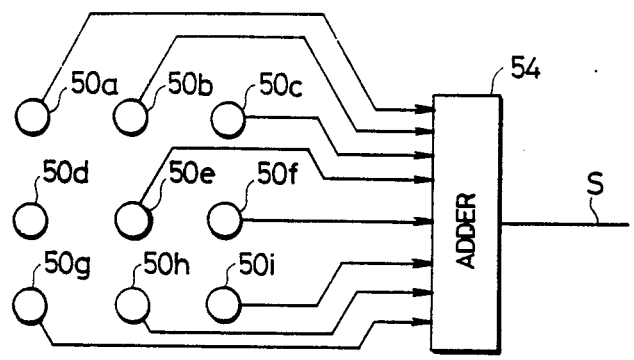
FIG. 5A is a block diagram of a calculation unit 27.

The calculating unit 27 calculates the total sum of the output signals 105 in a block of 3×3 pixels. FIG. 5A is a block diagram of the present embodiment. Pixel signals 50a–50i are data supplied from the line buffers 25a–25d, and the total sum S of said data is calculated by the adder 54. Then a comparator 28 compares the obtained sum with a predetermined threshold value T1 to obtain the result 101 of discrimination.

Said result of discrimination 101 is: "0" corresponding to characters and screen dots (edge portion) if the sum S is larger than threshold value T1; or "1" corresponding to photographs and background (non-edge area) if the sum S is smaller than threshold value T1.

Said result 101 is supplied to the switch 16 to select:
the first binary digitized data if the result is "1"; or
the second binary digitized data if the result is "0".

The coefficients of the Laplacian filter of the present embodiment are shown in FIG. 4A, but similar results can be obtained with circuits of the coefficients as shown in FIG. 4B or 4C.

Figure 5B:
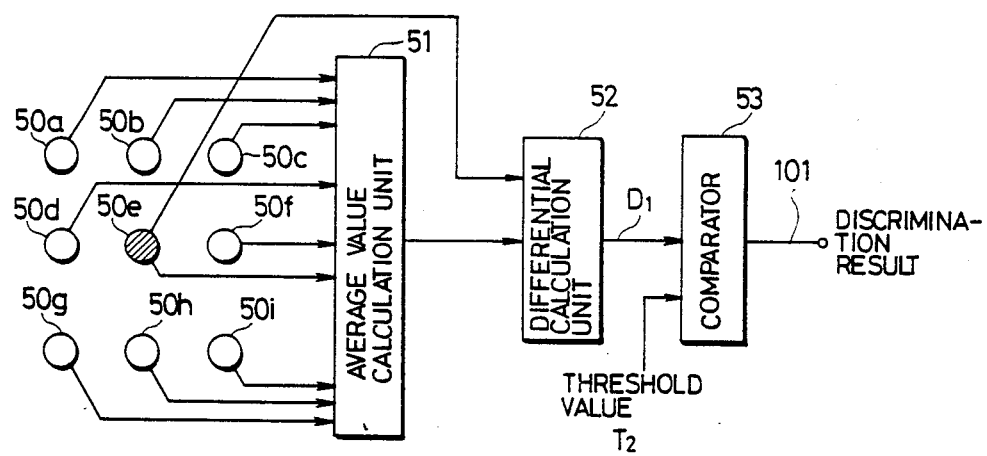
FIG. 5B is a block diagram of a circuit for calculating the difference between the density of a central pixel and the average density of surrounding pixels.

The discrimination circuit 13 may also be so constructed as to obtain the result of discrimination by comparing the absolute value of difference in density between the central pixel and surrounding pixels, with a threshold value, as shown in FIG. 5B. An average calculation unit 51 calculates the average density of the central pixel 50e and the surrounding pixels 50a, 50b, 50c, 50d, 50f, 50g, 50h and 50i, and a differential calculation unit 52 calculates the absolute value D of the difference between said average density and the density of the central pixel 50e. Then a comparator 53 compares said absolute value with a predetermined threshold value T2 to obtain the result 101 of discrimination. Said result of discrimination is:

"0" corresponding to characters and screen dots (edge area) if the difference D1 is larger than threshold value T2; or "1" corresponding to photographs and background (non-edge area) if the difference D1 is smaller than threshold value T2.

As an alternative method, it is also possible to calculate the difference between the maximum and minimum values of the image data in an m×n pixel block and to compare said difference with a predetermined threshold value to obtain the result 101 of discrimination.

Said result of discrimination is:

"0" corresponding to characters and screen dots (edge area) if the difference is larger than the threshold value; or "1" corresponding to photographs and background (non-edge area) if the difference is smaller than threshold value.

This method of discrimination allows one to obtain a reproduced image with high image quality from an original image containing characters, line-tone image, photographs and screen dot images, by selecting the binary digitized signal according to the image areas in the following manner:

for photographs and background (non-edge area); binary digitization by error dispersion method with a large matrix;

for characters, linetone images and screen dot images (edge area); binary digitization by error dispersion method with a small matrix.

More specifically, the edge area and non-edge area are discriminated in the image, and, in the edge area, the error dispersion method is conducted with a smaller matrix. The formation of white areas adjacent to the line edges can therefore be prevented, and the use of a smaller matrix reduces the area of error dispersion, thereby reproducing characters and lines in precise manner.

In the non-edge area, the error dispersion method is conducted with a larger matrix, so that it is possible to prevent the formation of stripe patterns specific to this method in the photograph area or in the background area. Also the use of a larger matrix increases the area of error dispersion, thereby providing a smoother output image.

In the foregoing it has been explained to vary the size of the matrix in the error dispersion method by discriminating the edge area and non-edge area of the image. In the following there will be explained an embodiment in which the matrix size is varied according to the discrimination of image density.

Example of discrimination 2

The error dispersion method is characterized as follows according to size of the error dispersing matrix:

Large matrix size: dots are relatively uniform in the highlight and shadow areas and noises are not conspicuous, but white areas are often generated at right to and below the edges of characters;

Small matrix size: dots in highlight and shadow areas are random in size and noises are conspicuous, but no white areas are generated adjacent to the edges of characters.

Figure 11:
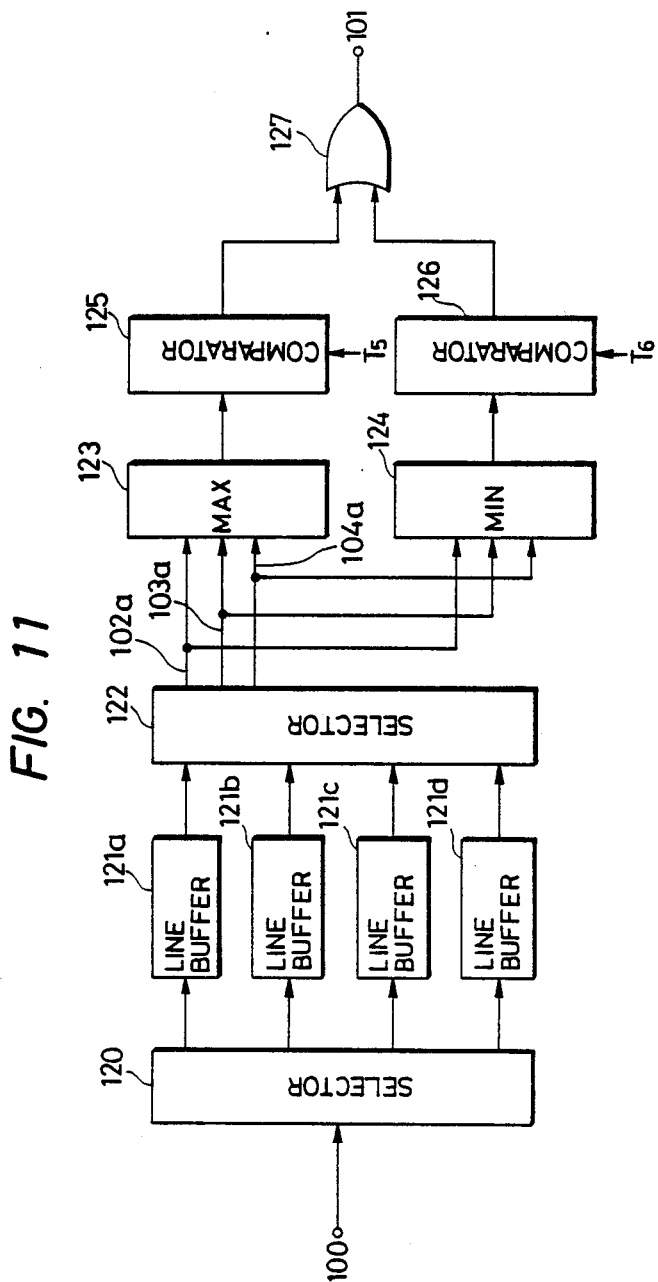
FIG. 11 is a block diagram of another embodiment of the discrimination circuit.

FIG. 11 is a block diagram of an embodiment of the discrimination circuit 13 for discriminating a highlight area, a shadow area and an intermediate density area. The image signal 100 after correction is supplied to one of line buffer memories 121a-121d selected by a selector 120. While one of the line buffers 121a-121d is in writing operation, the other three are in reading operation. When the first line buffer 121a is filled with the image data 100, the succeeding data are stored in the second line buffer 12b, then third and fourth line buffers 21c, 21d, and, when said fourth line buffer is filled, the data writing returns to the first line buffer 121a.

Consequently, the data of three consequtive lines, preceding the line currently in writing operation, are stored in the line buffers. Said data are selectively read by a selector 122, and supplied to a maximum value detecting circuit 123 and a minimum value detecting circuit 124. The maximum and minimum values detected therein are respectively compared with threshold values T5, T6 by comparators 125, 126. The result of discrimination is "1" if the maximum value is equal to or larger than the threshold value T5, or if the minimum value is equal to or smaller than the threshold value T6. An OR gate 127 calculates the logic sum of these two outputs, thus providing the result 101 of discrimination. In summary:

if maximum value $\geq$ T5, output is "1" (highlight);
if minimum value $\leq$ T6, output is "1" (shadow); or
in other cases, output is "0" (intermediate density);
  wherein $0 < T5 < < T6$.

Figure 12:
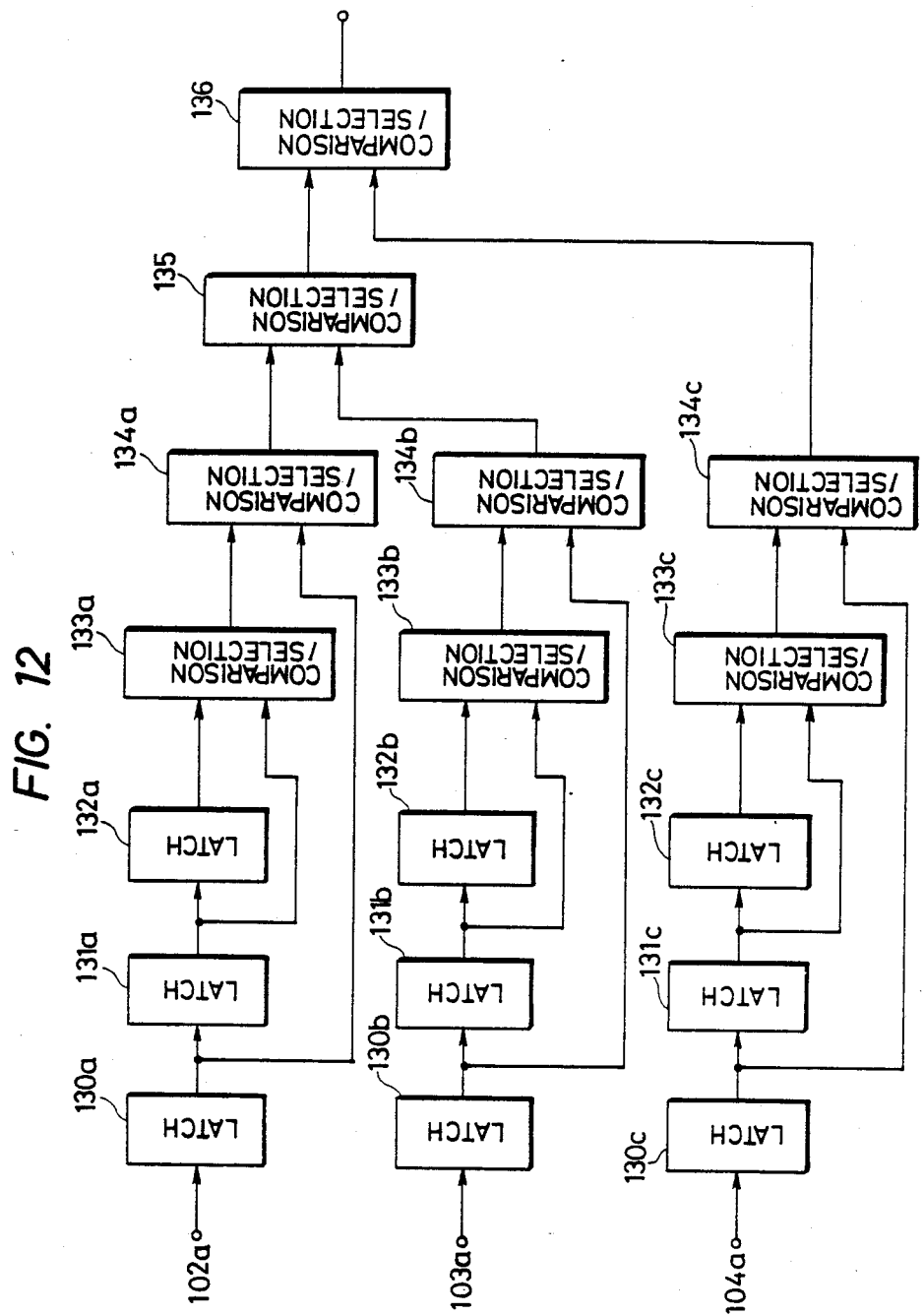
FIG. 12 is a block diagram of a maximum or minimum detecting circuit.

FIG. 12 is a block diagram of an embodiment of the maximum detecting circuit 123 and the minimum detecting circuit 124. The image data 102a, 103a, 104a of the lines selected by the selector 22 are delayed pixel by pixel in latches 130a-130c, 131a-131c, 132a-132c.

Figure 13:
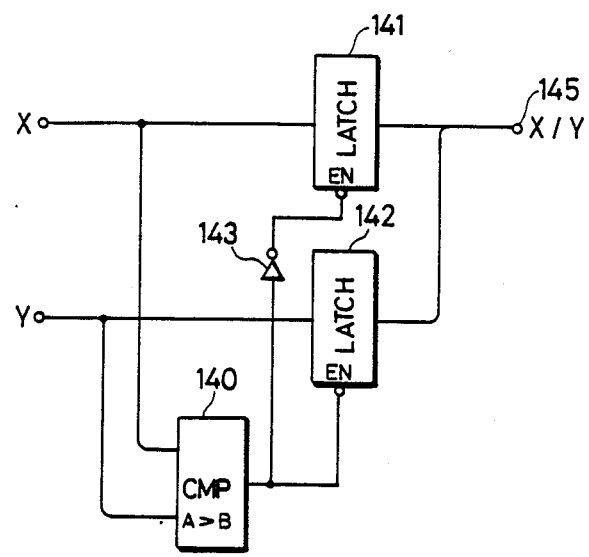
FIG. 13 is a block diagram of a comparison-selection circuit.

A comparator/selector 133a compares the data of the latches 131a and 132a, thus conducting a comparison of the signal of a pixel and that of an immediately following pixel. Similarly a comparator 134a compares the output of the comparator 133a with the signal of second following pixel. Consequently the output of the comparator 134a represents the maximum or minimum value of three consecutive pixels in a line. FIG. 13 shows an example of a comparator/selector in the maximum detector 123. Inputs X and Y are supplied to a comparator 140, and respectively to latches 141, 142.

The comparator 140 is so constructed as to provide an output "1" in case of X>Y. This output signal is supplied, through an inverter 143, to an enable terminal of a latch 141. If the enable input of the latches 141, 142 is based on negative logic, the output signal 145 is equal to X in case of X>Y, or equal to Y in case of X<Y. Therefore the maximum value of the signals X and Y is given as the output signal 145.

On the other hand, the minimum detector 124 can be of a same structure, except that the inverter 143 is connected to the latch 142.

A comparator/selector 135 detects the maximum or minimum value of the first and second lines, and a comparator/selector 136 detects the maximum or minimum value of thus obtained result and the third line.

Consequently, the output of a comparator/selector 136 represents the maximum or minimum value of a block of 3×3 pixels.

Figure 14:
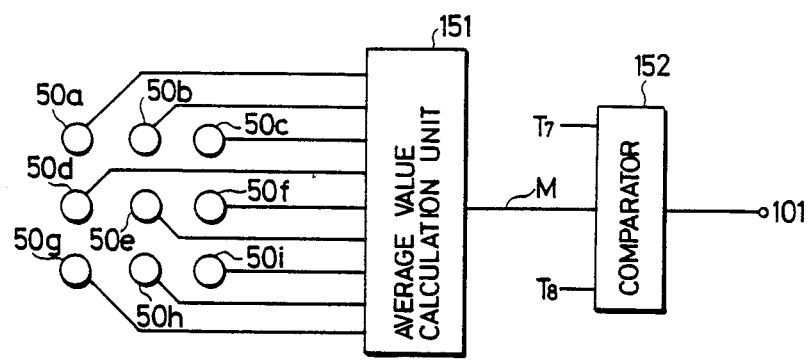
FIG. 14 is a block diagram showing another embodiment of the discrimination circuit.

FIG. 14 shows another embodiment of the discrimination circuit, wherein pixel data 50a-50i are supplied to an average calculator 151 to obtain an average value of the block of 3×3 pixels. The obtained result M is compared, in a comparator 152, with threshold value T7 and T8 (T7>T8).

By the following definitions according to the magnitude of the average value M:

M>T7 shadow area;
M<T8 highlight area;
T8$\leq$M$\leq$T7 intermediate density area;

there can be obtained the following results of discrimination:

output "1" for M>T7 or M<T8;
output "0" for T8$\leq$M$\leq$T7

Since granular noise is particularly conspicuous in the highlight area, it is also possible, as a simplified method, to use the first binary digitizing means only in the highlight areas.

This method of discrimination allows to obtain a reproduced image with high image quality from an original image containing characters, line-tone image, photographs and screen dot images, by selecting the binary digitizing process according to the image areas in the following manner:

highlight and shadow areas: binary digitizing with error dispersion method employing a large matrix; and intermediate density areas: binary digitizing with error dispersion method employing a small matrix.

In the highlight and shadow areas of the image, the error dispersion method with a large matrix disperses the error generated in the digitizaiton into a large area, in comparison with the case of employing a small matrix, thereby providing a smooth reproduced image. In this manner it is rendered possible to obtain an image without the sensible noises and to prevent the formation of stripe patterns.

In the intermediate density areas of the image, the error dispersion method with a small matrix reduces the area of error dispersion, thereby improving the resolving power. In this manner it is rendered possible to satisfactorily reproduce the image with intermediate tones.

In the following there will be explained the error dispersion method conducted in the first binary digitizing unit 14 and the second binary digitizing unit 15 shown in FIG. 1.

Figure 6:
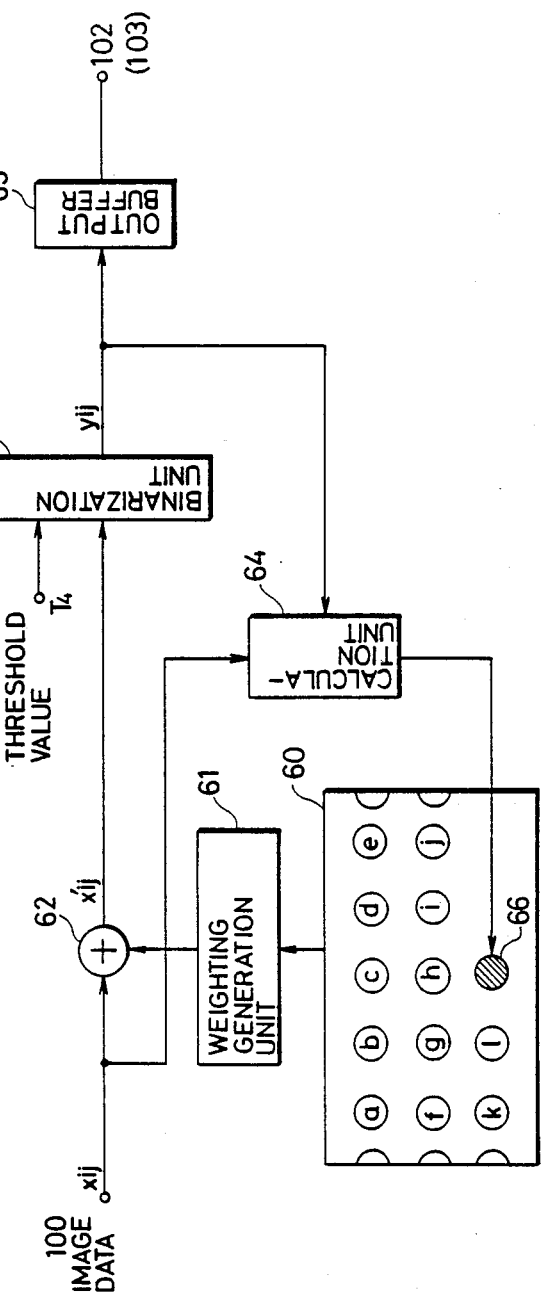
FIG. 6 is a block diagram of a digitizing circuit of error dispersion method in the first embodiment.

FIG. 6 is a block diagram of an embodiment of a binary digitizing process unit employing error dispersion method. Image signal 100 ($X_{ij}$) is added, in an adder 62, to the error $\epsilon_{ij}$ which is stored in an error buffer memory 60, multiplied by a weighting coefficient $\alpha_{kl}$ and normalized by division with $\Sigma\alpha_{kl}$ as represented by a following formula:

$$X'_{ij} = X_{ij} + \frac{\Sigma(\alpha_{kl} \cdot \epsilon_{i+k, j+l})}{\Sigma\alpha_{kl}}$$

The error $\epsilon_{ij}$ stored in the error buffer memory 60 is the difference between a corrected signal $X'_{ij}$ added in the adder 62 immediately before the currently processed signal and the binary digitized output signal $y_{ij}$. The error buffer memory shown in FIG. 6 indicates error a−1 generated in 12 pixels around the currently processed signal. A weighting generation unit 61 multiplies the errors $\epsilon_{ij}$(a−1) stored in the error buffer memory 60 respectively with weighting coefficients $\alpha_{kl}$ shown in FIG. 7A or 7B, utilizing a large matrix shown in FIG. 7A for the first binary digitizing unit 14 and a small matrix shown in FIG. 7B for the second binary digitizing unit 15.

The corrected signal $X'_{ij}$ obtained by addition in the adder 62 is then compared with a threshold value T4 in a binary digitizing unit 63 to provide an output $y_{ij}$, which assumes the form of binary digitized values for example $y_{max}$ and $y_{min}$, such as 255 and 0.

Said binary digitized signal is synchronized, in an output buffer 65, with the aforementioned output 101 of discrimination by the discrimination unit 13, thereby providing a binary digitized output 102 (103).

On the other hand, in a calculation unit 64, a difference or an error $\epsilon_{ij}$ between the corrected signal $X'_{ij}$ and the output signal $Y_{ij}$ is calculated and stored in a buffer memory, corresponding to a pixel position 66 currently under processing in the buffer memory 60. Succeeding image signal is processed in a similar manner, so that each error $\epsilon_{ij}$ in the error buffer memory 60 is displaced to the right by one pixel. The binary digitization of the error dispersion method is achieved by repeating the above-explained procedure.

Figures 7A, 7B, 8:
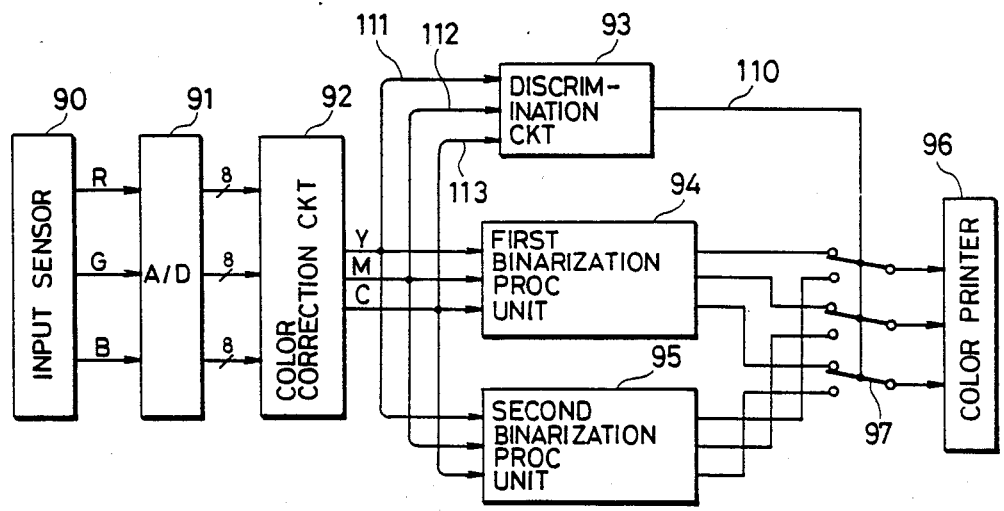
FIG. 7A is a chart showing weighting coefficients of a large matrix.
FIG. 7B is a chart showing weighting coefficients of a small matrix.
FIG. 8 is a block diagram of a color image processing apparatus embodying the present invention.

FIGS. 7A and 7B show examples of weighting coefficient matrix, wherein FIG. 7A shows weighting coefficients of a large matrix size employed in the first binary digitizing circuit, while FIG. 7B shows those of a small matrix size employed in the second binary digitizing circuit.

FIG. 8 is a block diagram of an embodiment applied to a color image. A color image input unit 90 releases red signal, green signal and blue signal obtained by color separation. These signals are converted, in an A/D converter 91, into digital signals of 8 bits for each color. Then a correction circuit 92 performs a shading correction, a complementary color conversion from R, G and B signals to Y, M and C signals, and a masking process to generate yellow signal, magenta signal and cyan signal. These three color signals are supplied to a discrimination circuit 93, a first binary digitizing circuit 94 and a second binary digitizing circuit 95. Each of the binary digitizing circuits 94, 95 can be realized by three sets of the aforementioned binary digitizing circuit.

Figure 9:
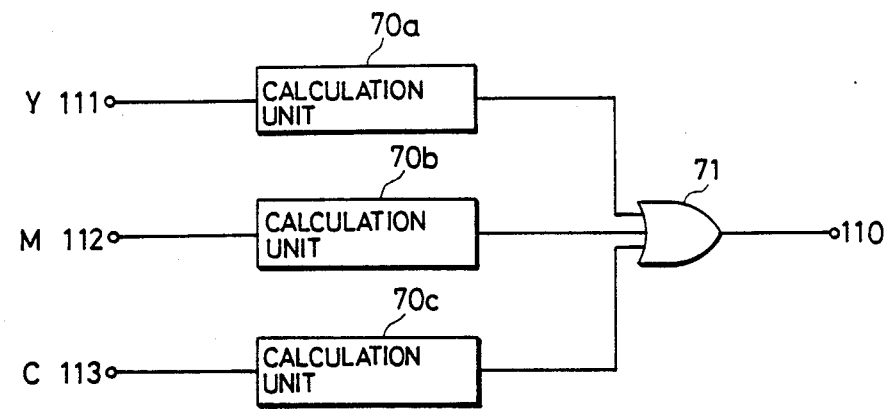
FIG. 9 is a block diagram of a discrimination circuit in FIG. 8.

On the other hand, the discrimination circuit 93 is composed, as shown in FIG. 9, of three sets of a monocolor discrimination circuit 70, of which outputs are passed through an OR gate 71 to obtain the result 110 of discrimination.

Figure 10:
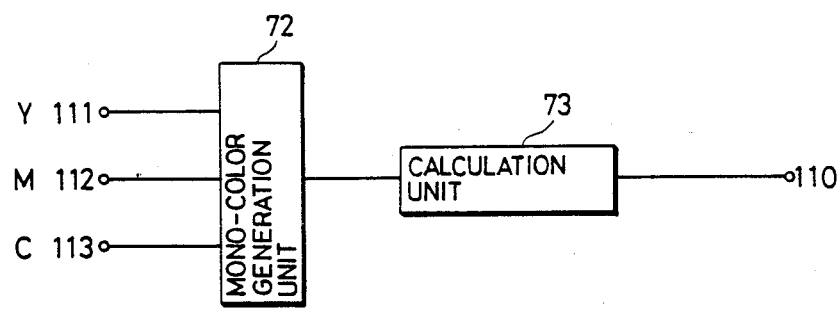
FIG. 10 is a block diagram of a second embodiment of the discrimination circuit shown in FIG. 8.

FIG. 10 shows another embodiment in which a monocolor generation unit 72 calculates the average value of the yellow, magenta and cyan signals, and said average value is supplied to a discrimination unit 73 to obtain the result 110 of discrimination.

In the present embodiment, as explained in the foregoing, the error dispersion method is conducted with a large matrix in the non-edge area, highlight area and shadow area to prevent formation of the stripe patterns particularly conspicuous in the photograph, background, highlight and shadow areas, thereby providing a smooth reproduced image without sensible noises.

Also the error dispersion method is conducted with a small matrix in the edge area and intermediate density area to reproduce the characters and line-tone images with a high resolving power and to reproduce satisfactory intermediate tone image with high image quality.

The discrimination circuit shown in the present embodiment is merely an example, and may be composed of any circuit capable of discrimination corresponding to the binary digitizing matrix employed in the error dispersion method. Also the size of matrix and the method of selection thereof are not limited to those shown in the present embodiment.

In the foregoing embodiment the matrix size is varied in two levels, but in the following there will be explained an embodiment of switching the matrix size in a larger number of levels.

Figure 15:
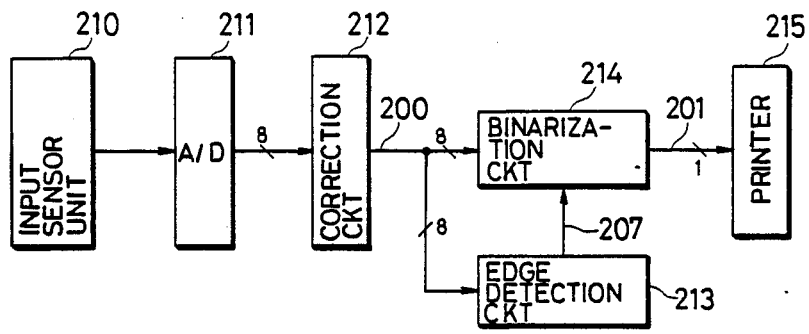
FIG. 15 is a block diagram showing a second embodiment of the image processing apparatus of the present invention.

FIG. 15 is a block diagram of a second embodiment of the present invention. An input sensor unit 210, for reading an original image by scanning operation, is composed of a photoelectric converting device such as CCD and a device for driving the same. An image signal read by the input sensor unit 210 is supplied to an A/D converter 211 for conversion of each pixel into a digital signal of 8 bits, representing 256 density levels. Then a correction circuit 212 executes, in digital manner, a shading correction for compensating the unevenness in the sensitivity of the CCD and the unevenness in the intensity of illumination. The corrected signal 200 is then supplied to an edge detection circuit 213 and a binary digitizing circuit 214. The edge detection circuit 213 detects an edge component in the image, sends a corresponding signal 207 to the binary digitizing circuit 214 and varies the matrix size therein according to said signal. The binary digitizing circuit 214 executes binary digitizing with the error dispersion method and sends a dot on/off signal 215 to a printer 215, which is a digital printer such as a laser beam printer or an ink jet printer, capable of forming an image with said dot on/off signal 201.

Figure 16:
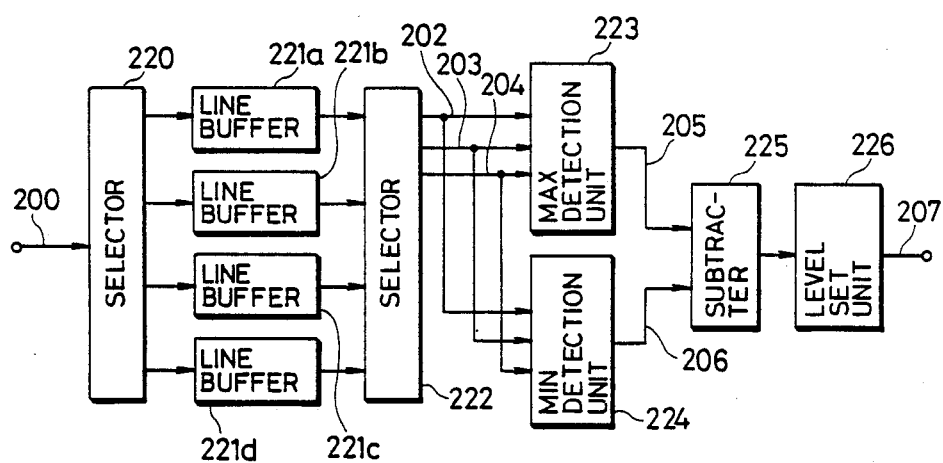
FIG. 16 is a block diagram of an embodiment of an edge detecting circuit.

FIG. 16 is a block diagram showing the details of the edge detection circuit 213 shown in FIG. 15. The image signal 200 corrected by the correction circuit 12 in FIG. 15 is supplied to line buffers 221a–221d selected by a selector 220. The selector 220 selects one of said line buffers for writing operation. When the first line buffer 221a is filled with the image data 200, the succeeding data are stored in the second line buffer 221b, then third and fourth line buffers 221c, 221d, and, when said fourth line buffer is filled, the data writing returns to the first line buffer 221a.

Consequently, the data of three consecutive lines, preceding the line currently in writing operation, are stored in the line buffers, and are selected by a selector 222 for reading. The data are sent to a maximum detection circuit 223 and a minimum detection circuit 224. The maximum value 205 and the minimum value 206 are subjected to the calculation of the difference thereof in a subtractor 225, and said difference is converted, in a level setting unit 226, into one of three level signals 207 in the following manner:

level 1: max−min>Ta
level 2: Tb<max−min<Ta
level 3: max−min<Tb wherein Ta and Tb are experimentally determined constants, and the level 1 corresponds to large edges while the level 3 corresponds to small edges.

The details of the maximum detecting circuit 223 and of the minimum detecting circuit 224 are already shown in FIGS. 12 and 13 and will not therefore be explained further.

FIG. 17 is a block diagram showing another embodiment for obtaining the edge detection output 207 shown in FIGS. 1 and 2. There are shown a central pixel 250d and surrounding pixels 250a, 250b, 250d and 250e in the data of three lines from the selector 222 shown in FIG. 16. The signal of the central pixel is multiplied by a constant in a multiplier 251, and the result is supplied to a subtracter 253. On the other hand, the signals of the surrounding pixels are summed in an adder 252, and the obtained sum is supplied to the subtracter 253. With the Laplacian coefficients shown in FIG. 18A, the subtracter 253 provides an output:

output
253=constant×(250c)−{(2-50a)+(250b)+(250d)+(250e)} wherein the constant is 5.

The output of the subtracter 253 is supplied to a level setting unit 254 to generate on of three level signals 207 according to said output.

The edge detection can also be achieved with the Laplacian coefficients as shown in FIGS. 18B and 18C.

Figures 19, 20A, 20B, 20C:
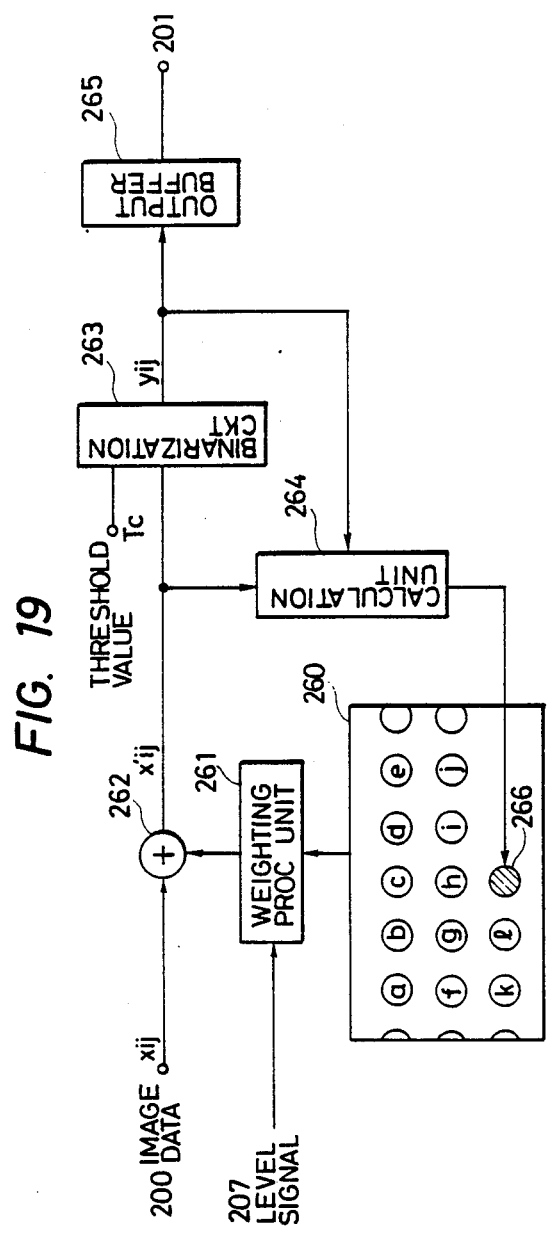
FIG. 19 is a block diagram of a digitizing circuit of error dispersion method in the second embodiment.
FIGS. 20A to 20C are charts showing weighting coefficients of a dispersion matrix of the error dispersion method.

FIG. 19 shows an embodiment of the binary digitizing circuit utilizing the error dispersion method, used as the digitizing circuit 214 in FIG. 15. The image signal 200 ($X_{ij}$) is added, in an adder 262, to the error $\epsilon_{ij}$, which is stored in an error buffer memory 260 and which, in a weighting unit 261, is multiplied by a weighting coefficient $\alpha_{kl}$ based on the edge level signal 207 shown in FIG. 16 or 17 and normalized by division with $\Sigma\alpha_{kl}$, as represented in the following formula:

$$X'_{ij} = X_{ij} + \frac{\Sigma(\alpha_{kl} \cdot \epsilon_{i+k,j+l})}{\Sigma\alpha_{kl}}$$

wherein the error $\epsilon_{ij}$ stored in the error buffer memory 260 is the difference between the corrected signal $X'_{ij}$ added immediately before the currently processed signal in the adder 262. The error buffer memory 260 in FIG. 19 indicate the errors a−l of twelve pixels surrounding the currently process signal. The weighting process unit 261 multiplies the errors $\epsilon_{ij}$ (a−l) stored in the error buffer memory 260 respectively with the weighting coefficients $\alpha_{kl}$ as shown in FIGS. 20A–20C according to the edge level signal mentioned above. It is to be noted that the coefficients $\alpha_{kl}$ shown in the matrixes in FIGS. 20A–20C are represented in values after division with $\Sigma\alpha_{kl}$.

The corrected signal $X'_{ij}$ in the adder 262 is compared, in a binary digitizing circuit 263, with a threshold value Tc to generate a signal $y_{ij}$, which assumes digitized forms for example $y_{max}$ and $y_{min}$, such as 255 and 0.

Said binary signal is synchronized, in an output buffer 265, with the aforementioned level signal 207 of the edge detecting circuit 213, thereby providing the final binary output signal 201.

On the other hand, a calculating unit 264 calculates the difference $\epsilon_{ij}$ of the corrected signal $X'_{ij}$ the output signal $Y_{ij}$, and said difference is stored in the buffer memory corresponding to the position 266 of the pixel currently under processing in the error buffer memory 260. Succeeding data are similarly processed, so that the errors $\epsilon_{ij}$ in the error buffer memory 260 are displaced by one pixel to the right. The binary digitizing of the error dispersion method can be achieved by repeating the above-explained procedure.

Figure 21:
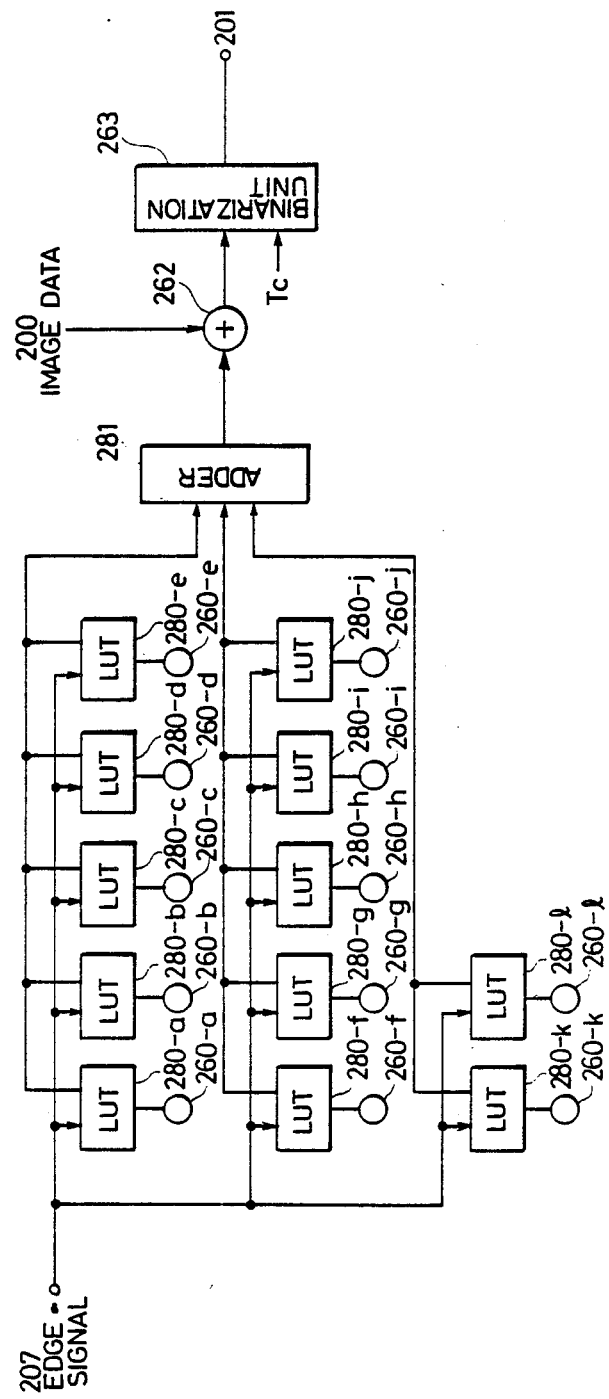
FIG. 21 is a block diagram of a circuit for varying the weighting coefficients according to an edge signal.

FIG. 21 is a block diagram of a circuit for switching the matrix size in the weighting process circuit 261, in response to the edge signal.

The matrix size is larger in FIG. 20B than in FIG. 20A, and in FIG. 20C than in FIG. 20B, as explained before. The error data 260a–260l of the error buffer memory are respectively supplied to look-up tables (LUT) 280a–280for executing multiplications according to respective weighting coefficients. The obtained results are summed in an adder 281, and then are added to the image signal in the adder 262. Said look-up table (LUT) can switch the weighting coefficients according to the level signal 207. Following table 1 shows the weighting coefficients in the respective pixel positions, corresponding to edge level signals 1, 2 and 3. The small matrix size in FIG. 20A corresponds to the edge level signal "1" with large edge component, while the medium matrix size in FIG. 20B corresponds to the edge level signal "2", and the large matrix size in FIG. 20C corresponds to the edge level signal "3" with small edge component.

The above-explained structure allows to vary the size of the dispersion matrix in the error dispersion method, in response to the edge level signal.

Also by suitably setting the values of the weighting coefficients of Tab. 1 in the same structure as in the present embodiment, it is possible to switch to a matrix of different weighting distribution though the matrix size remains same, and thus to obtain equivalent effect.

TABLE 1

| Pixel position | Edge signal | | |
|---|---|---|---|
| | 1 | 2 | 3 |
| a | 0 | 0 | 1/48 |
| b | 0 | 1/18 | 3/48 |
| c | 0 | 2/18 | 5/48 |
| d | 0 | 1/18 | 3/48 |
| e | 0 | 0 | 1/48 |
| f | 0 | 0 | 3/48 |
| g | 1/6 | 3/18 | 5/48 |
| h | 2/6 | 4/18 | 7/48 |
| i | 1/6 | 3/18 | 5/48 |
| j | 0 | 0 | 3/48 |
| k | 0 | 0 | 5/48 |
| l | 2/6 | 4/18 | 7/48 |

Figure 22:
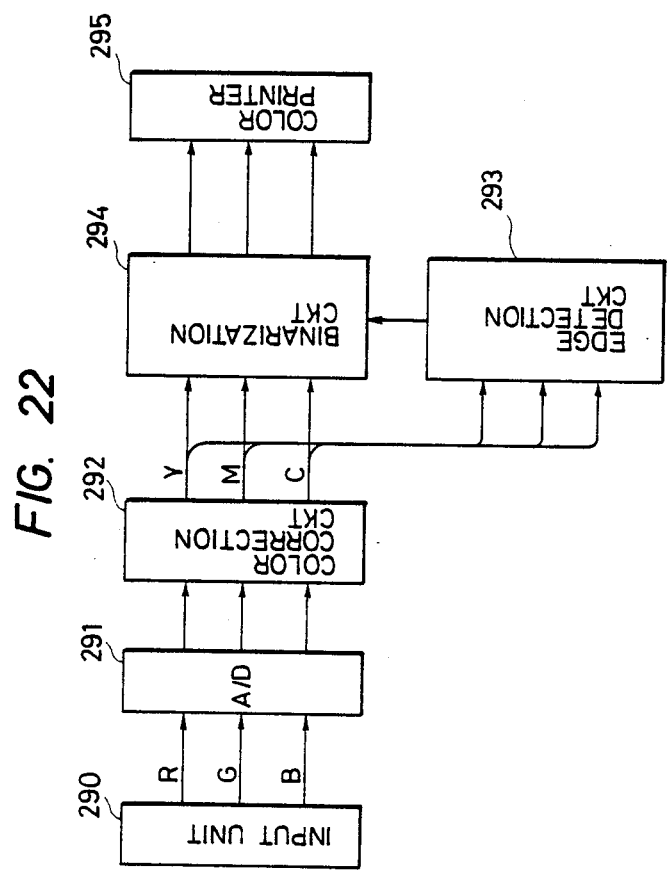
FIG. 22 is a block diagram of a color image forming apparatus in which the second embodiment of the present invention is applied.

FIG. 22 is a block diagram in which the foregoing embodiment is applied to a color image. A color image input unit 90 releases color-separated red, green and blue signals, which are converted, in an A/D converter 291, into digital signals of 8 bits for each color. A color correction circuit 292 executes shading correction, complementary conversion from R, G and B signals into Y, M and C signals and masking process to generate yellow, magenta and cyan signals. These three color signals are supplied to an edge detection circuit 293, and a binary digitizing circuit 294, which has three sets of the binary digitizing circuit 214 shown in FIG. 15. The edge detection circuit 243 can be composed of the circuits shown in FIGS. 7 and 10. In this case the calculation units 70a–70c are designed to effect edge detection.

As explained in the foregoing, the second embodiment is capable of varying the size of dispersion matrix employed in the error dispersion method according to the amount of edge components, and reduces the matrix size when the amount of edge components is large thereby preventing the formation of white areas at the edges encountered when a large matrix is used, and satisfactorily reproducing characters and line-tone images. Also when the amount of edge components is small, a large dispersion matrix is used to prevent the formation of stripe patterns found in the use of a small matrix, thereby providing a smooth reproduced image without noises in the photograph and background areas. Besides, in comparison with the case of selecting either one of large and small matrixes, the matrix size is stepwise selected according to the amount of edge components, thereby preventing a sudden change in the image quality 25 and allowing to obtain an even smoother reproduced image.

In the foregoing second embodiment the matrix size is changed in three levels according to the amount of edge components, but a still larger number of matrix sizes may be employed in a similar structure.

Also in said embodiment the matrix size is switched according to the amount of the edge components, but it is also possible to switch the matrix size stepwise according to the image density.

In such case the edge detection circuit 213 shown in FIG. 15 can be replaced by the average calculating unit 151 in FIG. 14 for determining the average density in the block and accordingly switching the matrix stepwise.

As explained in the foregoing, the image processing apparatus of the present embodiment is capable of varying the area of error dispersion according to the image characteristics, thus achieving image reproduction of high image quality on any image such as characters, screen dot images and photographs.

The present invention is not limited to the foregoing embodiments but is subject to various modifications within the scope and spirit of the appended claims.

What is claimed is:

1. An image processing apparatus comprising:
   digitizing means for digitizing image data;
   process means for dispersing an error, generated at the digitizing by said digitizing means, in an area around the image data; and
   discrimination means for discriminating whether the image data corresponds to an edge area or a non-edge area,
   wherein said process means is adapted to enlarge the area for error dispersion in a case of processing the image data of the non-edge area, as compared with a case of processing the image data of the edge area.

2. An apparatus according to claim 1, wherein said digitizing means is adapted to binary-digitize density data of an image with a predetermined threshold value.

3. An apparatus according to claim 2, wherein the error, to be dispersed by said process means in the area around the image data, is a difference between the density data of the image and output density data after the binary digitizing.

4. An apparatus according to claim 3, wherein said process means is adapted to disperse the error in the area around the image data by means of a matrix, and to vary the area for error dispersion by varying the matrix.

5. An image processing apparatus comprising:
   digitizing means for digitizing image data;
   process means for dispersing an error, generated at the digitizing by said digitizing means, in an area around the image data; and
   discrimination means for discriminating a density level of an image,
   wherein said process means is adapted to vary the area for error dispersion according to a result of discrimination performed by said discrimination means, and
   wherein said process means is adapted to make the area of error dispersion larger when the density level for the image is smaller than a predetermined value, than when the density level is larger than the predetermined value.

6. An apparatus according to claim 5, wherein said digitizing means is adapted to binary-digitize density data of the image with a predetermined threshold value.

7. An apparatus according to claim 6, wherein the error, to be dispersed by said process means in the area around the image data, is a difference between the density data of the image and output density data after the binary digitizing.

8. An apparatus according to claim 7, wherein said process means is adapted to disperse the error in the area around the image data by means of a matrix, and to vary the area for error dispersion by varying the matrix.

9. An image processing apparatus comprising:
   digitizing means for digitizing image data;
   process means for dispersing an error, generated at the digitizing by said digitizing means, in an area around the image data; and
   discrimination means for discriminating a density level of an image,
   wherein said process means is adapted to vary the area for error dispersion according to a result of discrimination of said discrimination means, and wherein said process means is adapted to make the area for error dispersion larger when the density level of the image is larger than a predetermined value, than when the density level is smaller than the predetermined value.

10. An apparatus according to claim 9, wherein said digitizing means is adapted to binary digitize density data of the image with a predetermined threshold value.

11. An apparatus according to claim 10, wherein the error, to be dispersed by said process means in the area around the image data, is a difference between the density data of the image and output density data after the binary digitizing.

12. An apparatus according to claim 11, wherein said process means is adapted to disperse the error in the area around the image data by means of a matrix, and to vary the area for error dispersion by varying said matrix.

13. An image processing method comprising the steps of:
digitizing image data;
dispersing an error, generated in the digitizing in said digitizing step, into an area around the image data; and
discriminating whether the image data corresponds to an edge area or a non-edge area,
wherein, in said dispersing step, the area for error dispersion is made larger in a case of processing the image data of a non-edge area of an image than in a case of processing the image data of an edge area.

14. A method according to claim 13, wherein, in said digitizing step, the density data of the image is being digitized with a predetermined threshold value.

15. A method according to claim 14, wherein the error, to be dispersed in the area around the image data in said dispersing step, is a difference between the density data of the image and the output density data after the binary digitizing.

16. A method according to claim 15, wherein, in said dispersing step, the error in the area around the image data is dispersed by means of a matrix, and the area for error dispersion is varied by varying the matrix.

17. An image processing method comprising the steps of:
digitizing image data;
dispersing an error, generated in the digitizing in said digitizing step, into an area around the image data; and
discriminating a density level of an image;
wherein said dispersing step is adapted to vary the area for error dispersion according to a result of discrimination in said discriminating step, and
wherein, in said dispersing step, the area for error dispersion is made larger in a case in which the density level of the image is smaller than a predetermined value, than in a case in which the density level is larger than the predetermined value.

18. A method according to claim 18, wherein, in said digitizing step, the density data of the image is binary digitized with a predetermined threshold value.

19. A method according to claim 18, wherein the error, to be dispersed in the area around the image data in said dispersing step, is a difference between the density data of the image and the output density data after the binary digitizing.

20. A method according to claim 19, wherein, in said dispersing step, the error is dispersed in the area round the image data by means of a matrix, and the area for error dispersion is varied by varying the matrix.

21. An image processing method comprising the steps of:
digitizing image data;
dispersing an error, generated in the digitizing in said digitizing step, into an area around the image data; and
discriminating a density level of an image,
wherein said dispersing step is adapted to vary the area for error dispersion according to a result of discrimination in said discriminating step, and
wherein, in said dispersing step, the area for error dispersion is made larger in a case in which the density level of the image is larger than a predetermined value, than in a case in which the density level is smaller than the predetermined value.

22. A method according to claim 21, wherein said digitizing step is adapted to binary-digitize the density data of the image with a predetermined threshold value.

23. A method according to claim 22, wherein the error, to be dispersed in the area around the image data in said dispersing step, is a difference between the density data of the image and the output density data after the binary digitizing.

24. A method according to claim 23, wherein, in said dispersing step, the error is dispersed in the area around the image data by means of a matrix, and the area for error dispersion is varied by varying the matrix.

25. An image processing apparatus comprising:
digitizing means for digitizing image data;
process means for dispersing an error, generated at the digitizing by said digitizing means, in an area around the image data; and
discrimination means for discriminating whether the image data exists in an edge area or a non-edge area,
wherein said process means is adapted to vary the area in which the error is dispersed, in accordance with whether the image data exists in an edge area or a non-edge area.

26. An apparatus according to claim 25, wherein said digitizing means is adapted to binary-digitize density data of an image with a predetermined threshold value.

27. An apparatus according to claim 26, wherein the error, to be dispersed by said process means in the area around the image data, is a difference between the density data of the image and the output density data after the binary digitizing.

28. An apparatus according to claim 27, wherein said process means is adapted to disperse the error in the area around the image data by means of a matrix, and to vary the area for error dispersion by varying the matrix.

29. An image processing apparatus comprising:
digitizing means for digitizing image data;
process means for dispersing an error, generated at the digitizing by said digitizing means, in an area around the image data; and
generating means for generating a signal representing whether an area quantized by said digitizing means is an edge area or a non-edge area.
wherein said process means makes larger the area for error dispersion in a case in which the signal representing non-edge area is generated by said generating means than in a case in which the signal representing edge area is generated.

30. An apparatus according to claim 29, wherein said digitizing means is adapted to binary-digitize density data of an image with a predetermined threshold value.

31. An apparatus according to claim 30, wherein the error, to be dispersed by said process means in the area around the image data, is a difference between the density data of the image and the output density data after the binary digitizing.

32. An apparatus according to claim 31, wherein said process means is adapted to disperse the error in the area around the image data by means of a matrix, and to vary the area for error dispersion by varying the matrix.

33. An apparatus according to claim 29, further comprising conversion means for inputting analog image data and converting the analog image data into digital image data, and wherein said digitizing means quantizes the digital image data.

34. An image processing apparatus comprising:
input means for inputting digital image data;
binarization means for binarizing the digital image data input by said input means by using a predetermined threshold value;
calculation means for calculating a difference between the digital image data input by said input means and output data after the digital image data has been binarized, to provide error data;
process means for processing such that the error data provided by said calculation means is dispersed to the peripheral digital image data; and
discrimination means for discriminating a feature of an area in which the digital image data input by said input means exists,
wherein said process means is adapted to vary the area in which the error data is dispersed, in accordance with the feature discriminated by said discrimination means.

35. An apparatus according to claim 34, wherein said input means further comprises conversion means for converting analog image data obtained by reading an original image into the digital image data.

36. An apparatus according to claim 34, wherein said discrimination means discriminates whether the area in which the digital image data exists is an edge area or a non-edge area.

37. An apparatus according to claim 36, wherein said process means varies the area in which the error data is dispersed, in accordance with whether the area in which the digital image data exists is an edge area or a non-edge area.

* * * * *

UNITED STATES PATENT AND TRADEMARK OFFICE
CERTIFICATE OF CORRECTION

PATENT NO. : 4,876,610

DATED : October 24, 1989

INVENTOR(S) : HIDEFUMI OHSAWA, ET AL.

It is certified that error appears in the above-identified patent and that said Letters Patent is hereby corrected as shown below:

ON THE TITLE PAGE,
IN [56] REFERENCES CITED

U.S. PATENT DOCUMENTS, "4,774,544  2/1988  Matsumoto" should read --4,724,544  2/1988  Matsumoto--.

COLUMN 3

Line 9, "5" should be deleted.
    Line 57, "21a-21$_d$" should read --21a-21d--.
    Line 67, "wi&h" should read --with--.

COLUMN 4

Line 43, "value D" should read --value D1--.
    Line 47, "discrimination. Said" should read --discrimination. ¶ Said--.

COLUMN 5

Line 54, "line buffer 12b," should read --line buffer 121b,--.

COLUMN 9

Line 7, "circuit 12" should read --circuit 212--.

COLUMN 10

Line 45, "280a-280for" should read --280a-2801 for--.

UNITED STATES PATENT AND TRADEMARK OFFICE
CERTIFICATE OF CORRECTION

PATENT NO. : 4,876,610

DATED : October 24, 1989

INVENTOR(S) : HIDEFUMI OHSAWA, ET AL.

It is certified that error appears in the above-identified patent and that said Letters Patent is hereby corrected as shown below:

COLUMN 11

Line 30, "units 70a-70care" should read --units 70a-70c are--.

Line 48, "25" should be deleted.

COLUMN 14

Line 62, "non-edge area." should read --non-edge area,--.

Signed and Sealed this

Twenty-fifth Day of August, 1992

Attest:

DOUGLAS B. COMER

Attesting Officer

Acting Commissioner of Patents and Trademarks